Nov. 9, 1943.   H. L. McFEATERS   2,334,019
SCREW BOX AND COVER FOR HOT METAL MIXERS
Filed Aug. 6, 1942   2 Sheets-Sheet 1
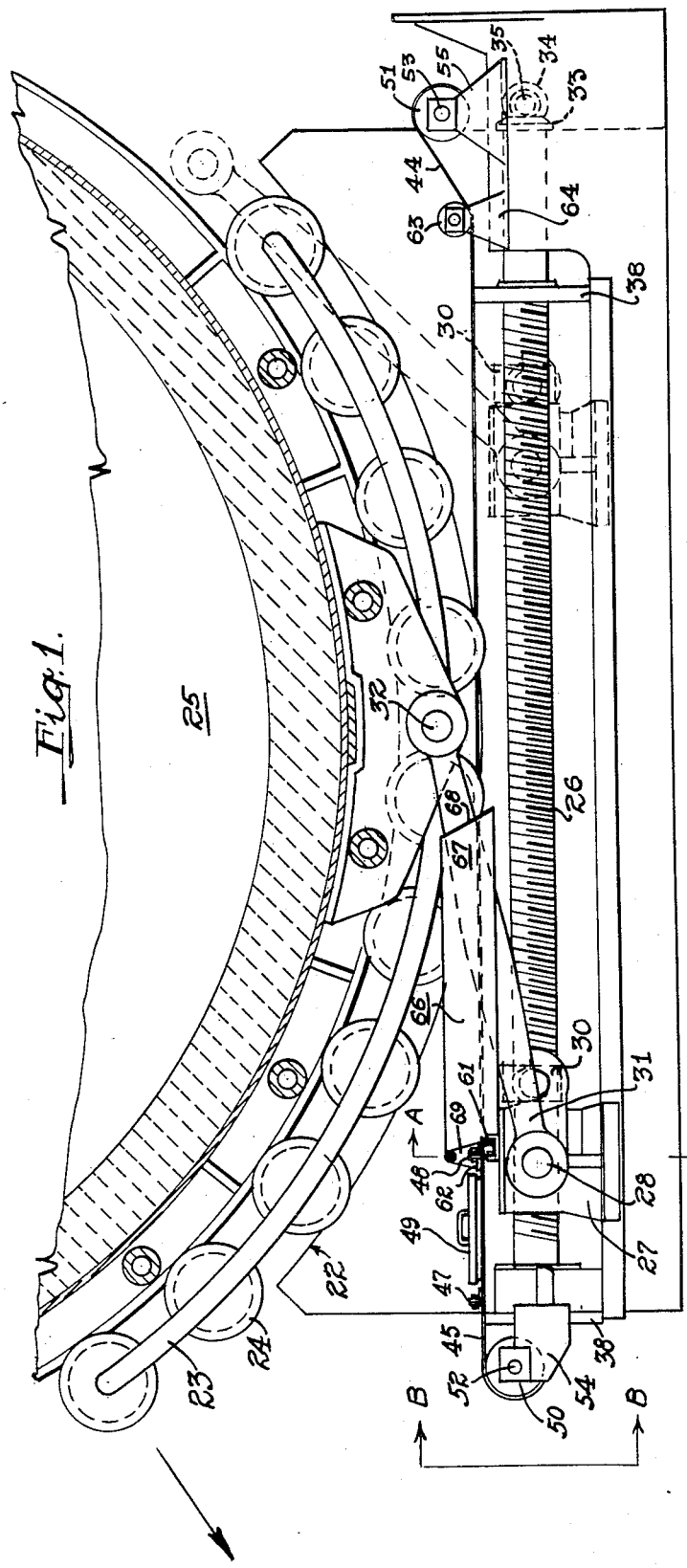
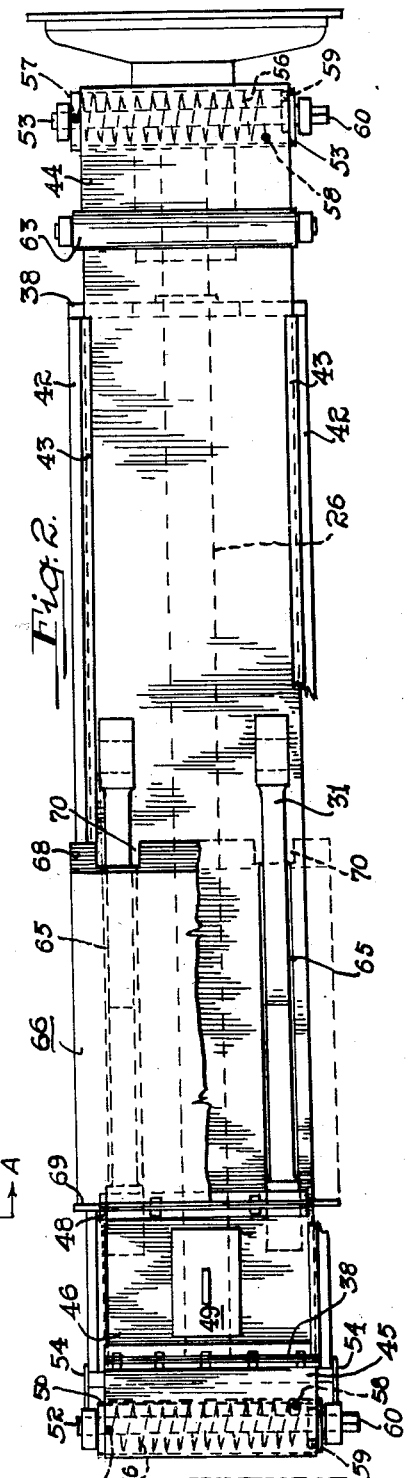

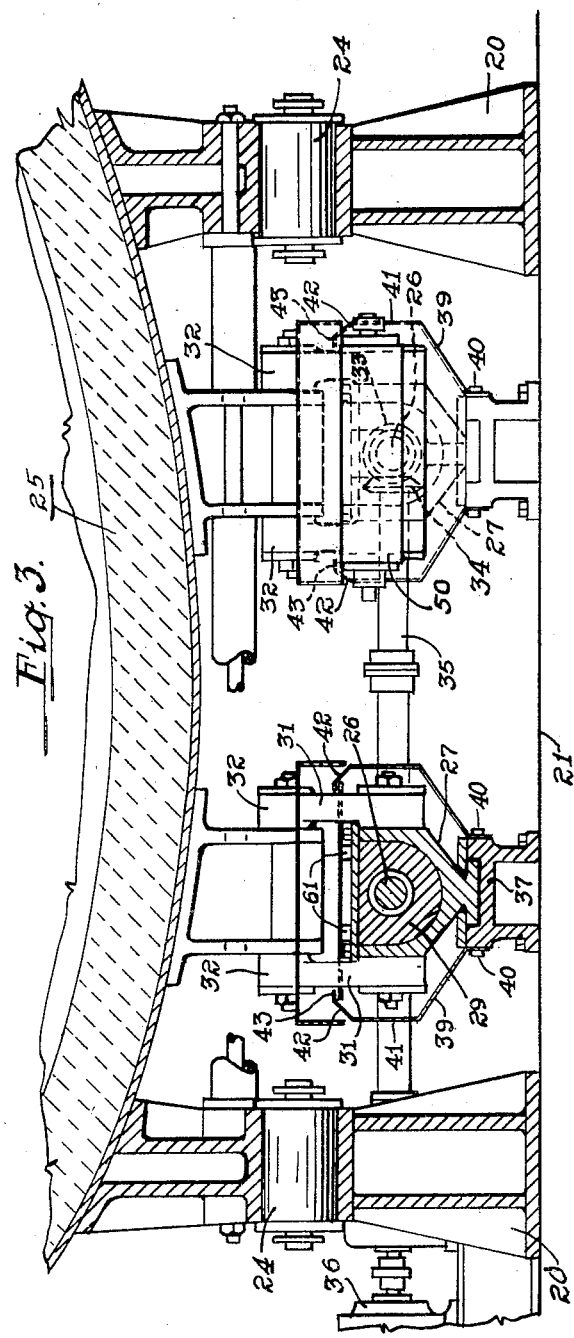

Patented Nov. 9, 1943

2,334,019

UNITED STATES PATENT OFFICE 2,334,019

SCREW BOX AND COVER FOR HOT METAL MIXERS

Harry L. McFeaters, New Castle, Pa., assignor to Pennsylvania Engineering Works, a corporation of Pennsylvania Application August 6, 1942, Serial No. 453,828

10 Claims. (Cl. 266—39)

This invention relates to tiltable receptacles such as hot metal mixers, to the screw operated mechanism for tilting and restoring or righting such receptacles and more particularly to means for closing the top of the screw box employed in connection with such mechanism.

The tilting mechanism for hot metal mixers commonly employs one or more power driven screw shafts, a crosshead for each screw shaft, a nut carried by each crosshead meshing with the threads of the screw shaft, rods for operatively connecting each crosshead to the receptacle and a box or trough-like housing for each screw shaft and crosshead adapted to contain oil for lubricating the enclosed mechanism.

An object of this invention is to produce a new and improved type of cover for the screw box of tilting mechanisms for hot metal mixers.

Another object is to produce improved structure for protecting, from the graphite or other flying material, the operating mechanism for tilting hot metal mixers.

These, and other objects which will be apparent to those skilled in this art, I attain by means of the mechanisms described in the specification and illustrated in the drawings accompanying and forming part of this application.

In the drawings:

Figure 1 is a more or less diagrammatic sectional elevational view of a portion of a hot metal mixer, one of the screw mechanisms for tilting the mixer, and a covering device for the screw box or enclosure which embodies this invention in its preferred form; the sides of the screw box or enclosure having been omitted for the purpose of clarification;

Fig. 2 is a top plan view of one of the screw boxes, enclosures or housings embodying this invention, with parts of the same broken away for the purpose of illustration;

Fig. 3 is a transverse view of the metal mixer and the screw operating mechanisms of Fig. 1 with the screw boxes, enclosures or housings in place. The left-hand portion of this view is taken on line A—A of Fig. 1, while the right-hand portion is taken on line B—B of Fig. 1;

Figs. 4 and 5 are fragmentary diagrammatic views illustrating a modified form of screw box or housing covering operationg mechanism embodying this invention;

Figs. 6 and 7 are more or less diagrammatic views illustrating another type of screw box or housing cover operating mechanism embodying this invention; and Fig. 8 is a diagrammatic view illustrating still another modified form of screw box housing cover embodying this invention.

In the drawings, spaced standards 20, supported on a foundation 21, each carry a track 22. On each of these tracks is a rocker 23 having a plurality of anti-friction rollers 24, and resting on these rollers 24 is the hot metal mixer 25, which as indicated in the drawings is of the barrel type.

The mixer is operated by two screw mechanisms and since these are identical, a description of but one is believed sufficient. One of the screw mechanisms without the box or housing sides is illustrated in side elevation in Fig. 1 and comprises a horizontal screw shaft 26 journaled in suitable bearings adjacent its ends, a crosshead 27 having trunnions 28 projecting laterally from opposite sides thereof, and a nut 29 which meshes with the threads of the screw shaft. The crosshead is preferably constructed as disclosed in Patent 2,166,663 of July 18, 1939, and carries an emergency nut 30 as disclosed in said patent.

Connecting rods 31 located on opposite sides of the crosshead each have one end connected to the crosshead trunnion 28 and the opposite end connected to the mixer as at 32. Screw shaft 26, at one end, carries a bevel gear 33 which meshes with a bevel gear 34 carried by a shaft 35 preferably driven by a reversible electric motor 36.

The crosshead is mounted for sliding movement longitudinally of the screw within a crosshead guide 37 supported upon foundation 21.

Crosshead guide 37 adjacent its opposite ends supports members 38 which are attached thereto and form end members for the screw box housing or enclosure. Each of these side members is formed of plate-like metal bent to provide a lower inclined portion 39, having at its bottom a downwardly extending flange which is bolted, as at 40, to its side of the crosshead guide, an intermediate vertically extending portion 41, an inwardly inclined upper portion 42 and a top horizontal flange portion 43 which extends inwardly toward the crosshead and overlies the flexible portion of the cover member for the screw box or housing, as will later appear.

The sides of the screw box extend to end members 38 (Figs. 1 and 2) and these end members preferably have their sides shaped to conform to the cross sectional shape of the screw box. The side members are suitably secured to the side edges of end members 38 in order to form a tight box or enclosure for containing an oil bath for the screw, the crosshead guide, the crosshead nuts and the lower end bearings of the connecting rods.

The inwardly extending top flanges 43 of the side members are spaced a slight distance above the top edges of end members 38 and bear on the top of the flexible portions of the screw box cover.

The screw box cover

The screw box cover comprises two sheet-like flexible metal sections 44 and 45 and a more or less rigid plate-like section 46 which is connected to the sheet-like sections by means of two pairs of angles 47—48. One angle of each pair is preferably riveted to the adjacent flexible sheet-like section, while the other is riveted to the rigid plate-like section. The angles of each pair are either bolted or riveted together.

Plate-like section 46 is provided with an opening having an upstanding edge flange. A removable cover 49 fits over said flange for closing said opening. This opening is provided in order to permit access to the interior of the screw box or housing when necessary or desirable.

In the preferred forms of Figs. 1, 2 and 3, the outer end portions of flexible sections 44 and 45 of the cover are wound or coiled on rollers 50 and 51 to which they are secured. These rollers are mounted for rotation on stationary shafts which are respectively numbered 52 and 53 and these shafts are carried by brackets respectively numbered 54 and 55.

A helical spring 56 encircles each shaft within the roller supported thereby, and one end of such spring is secured to the shaft as at 57 while the other end is secured to the roller as at 58. The spring within roller 50 tends to yieldingly rotate said roller counterclockwise while the spring within roller 51 tends to yieldingly rotate said roller in the opposite direction, or clockwise.

Interposed between each roller and its shaft is a pawl and ratchet device 59, and each such device is provided with an outwardly extending polygonal head 60 by means of which the tension of the spring may be adjusted as will be readily understood.

A member 61, which preferably takes the form of a bar, is secured to the underside of the pair of angles 48 which join flexible section 44 of the cover to rigid section 46 and the crosshead carries a channel-shaped member 62 which embraces member 61, and with member 61 forms a driving connection between the crosshead and the screw box cover. The construction and arrangement of these parts is such that as the crosshead is reciprocated by screw shaft 26, the cover member made up of sections 44, 45 and 46 is reciprocated within and below horizontal flanges 43—43 of the screw box side members. The inclined portions 42—42 of the side members serve as side guides for the flexible sections 44 or 45 of the cover during longitudinal movement of the cover. The tension of springs 56 is so adjusted that the flexible portions of the cover are kept taut during such movement. It will be apparent that as the flexible portions of the cover are wound up or coiled on one roller, they will be unwound or uncoiled from the other roller.

Flexible section 44 of the cover is held in contact with the upper surface of end member 38 by an idler roller 63 which is vertically adjustable, bears on the top of said flexible section and is carried by support brackets 64. Flexible section 44 in line with connecting rods 31 is slotted as shown at 65—65 to accommodate the connecting rods which extend upwardly through such slots.

A supplemental cover 66 formed of plate-like metal, having downwardly extending sides 67 and a downwardly inclined outer end 68, is hinged to brackets 69 carried by angles 48. The outer inclined end 68 of this supplemental cover is slotted as shown at 70—70, so that the side edges of said slots straddle the connecting rods. The supplemental cover rests on the connecting rods and swings about its pivot point as the position of the connecting rods changes during reciprocation of the crosshead. The supplemental cover to a large extent prevents graphite and other flying material from falling into the screw box through slots 65—65.

In the modified form diagrammatically illustrated in Figs. 4 and 5, the rollers instead of being yieldingly urged in opposite directions by means of springs, are simultaneously driven in the same direction by means of sprockets and a chain which encircles said sprockets.

Roller 71 is mounted on a shaft 72 which is journaled in a fixed bearing 73 and shaft 72 has a sprocket wheel 74 secured thereto.

The outer end portion of one of the sheet-like sections of the cover member is coiled about roller 71 and is secured to said roller. The other flexible section of the cover member is coiled about roller 75 and is secured to said roller.

Roller 75 is secured to a shaft 76 which is journaled within a bearing block 77, which is mounted for sliding movement within guides 78—78. A sprocket wheel 79 is secured to shaft 76. A sprocket chain 80 encircles sprockets 74 and 79 and is kept taut by means of a helical spring 81. One end of this spring bears against bearing block 77 while the opposite end of the spring bears against an abutment plate 82.

An adjustment screw 83 which is threaded through a fixed member 84 bears against plate 82 and provides means for adjusting the pressure exerted by spring 81. This spring is of such strength and is so adjusted as to keep the sprocket chain, and therefore the cover member, or at least the flexible sections thereof, taut during movement of the crosshead and consequently movement of the cover member.

In the modified form of Figs. 6 and 7, rollers 85 and 86 about which the flexible sections of the cover member are coiled and to which they are secured, are secured to shafts numbered 87 and 88 respectively. Each of these shafts has secured thereto a pulley or wheel such as wheel 89 and ropes or cables such as cable 90—90 coiled about such pulleys or wheels and secured thereto extend downwardly into pits such as pits 91—91 and at their lower ends carry counterweights 92 which are preferably made in sections so that said weights can be adjusted to properly tension the flexible sections of the cover member.

The cables 90—90 are so wound upon the pulley that the weighted cables tend to rotate rollers 85 and 86 in opposite directions as do the springs in the preferred form of Figs. 1 to 3 inclusive.

In the modified form of Fig. 8, rollers 93 and 94 are merely support rollers. The flexible sections of the cover member pass over these rollers and extend downwardly into suitable pits 95—95, and attached to the lower end of each flexible portion is a counterweight 96. Each of these counterweights is preferably sectional and may be carried by a counterweight retainer attached to the lower end of the depending flexible section.

Having thus described my invention, what I claim as new and desire to secure by Letters Patent is:

1. The combination with a tiltable receptacle, a power driven screw, a crosshead having a nut which engages said screw, a rod operatively connected to said crosshead and the receptacle, and a housing for said screw and crosshead and having an open top through which said rod extends, of a cover over and above the top of said housing and which in part at least is sheet-like and flexible, and is provided with a slot through which said rod extends, means connecting said cover and said crosshead whereby said cover is longitudinally reciprocated as said crosshead is reciprocated, and means for maintaining said cover under tension.

2. The combination with a tiltable receptacle, a power driven screw, a crosshead carrying a nut which engages said screw, connecting rods operatively connected to said crosshead and the receptacle, and a housing for said screw and crosshead and having an open top through which said rods extend, of a cover over and above said housing and which in part at least is flexible, and is provided with a slot through which said rods extend, means connecting said cover and said crosshead whereby said cover is longitudinally reciprocated as said crosshead is reciprocated, and spring operated means for maintaining the flexible parts of said cover taut during its reciprocations.

3. The combination with a tiltable receptacle, a power driven screw, a crosshead having a nut engaging said screw, a rod operatively connected to said crosshead and said receptacle, and a trough-like housing for said screw and crosshead, and having an open top through which said rod extends, of a member which has flexible sheet-like end portions, and an intermediate more or less rigid portion, forms a cover over and above the top of said trough-like housing and is provided with a slot through which said rod extends, means connecting said member and said crosshead for causing said member to move longitudinally as said crosshead is moved, and means for maintaining such member under tension and keeping its sheet-like portions taut.

4. The combination with a tiltable receptacle, a power driven screw, a crosshead having a nut engaging said screw, a rod operatively connected to said crosshead and said receptacle, and a trough-like housing for said screw and crosshead, and having an open top through which said rod extends, of a member which in part at least is sheet-like and flexible, forms a cover over and above the top of said trough-like housing and is provided with a slot through which said rod extends, means connecting said member and said crosshead whereby said member is moved longitudinally as said crosshead is moved, means for maintaining such member under tension, and means forming part of said trough-like housing and which overlies side edge portions of the sheet-like part of said member.

5. The combination with a tiltable receptacle, a power driven screw, a crosshead having a nut engaging said screw, a rod operatively connected to said crosshead and said receptacle, and a trough-like housing for said screw and crosshead, and having an open top through which said rod extends, of a member which has flexible sheet-like end portions, forms a cover over and above the top of said trough-like housing and is provided with a slot through which said rod extends, means connecting said member and said crosshead whereby said member is moved longitudinally as said crosshead is moved and spring operated means for maintaining such member under tension and keeping its sheet-like end portions taut.

6. The combination with a tiltable receptacle, a power driven screw, a crosshead having a nut engaging said screw, a rod operatively connected to said crosshead and said receptacle, and a trough-like housing for said screw and crosshead, and having an open top through which said rod extends, of a member which in part at least is sheet-like and flexible, forms a cover over and above the top of said trough-like housing and is provided with a slot through which said rod extends, means connecting said member and said crosshead whereby said member is moved longitudinally as said crosshead is moved, and weight operated means for maintaining such member under tension.

7. The combination with a tiltable receptacle, a power driven screw, a crosshead having a nut engaging said screw, a rod operatively connected to said crosshead and said receptacle, and a trough-like housing for said screw and crosshead, and having an open top through which said rod extends, of a member which in part at least is sheet-like and flexible, forms a cover over and above the top of said trough-like housing and is provided with a slot through which said rod extends, means connecting said member and said crosshead whereby said member is moved longitudinally as said crosshead is moved, and counterweights for maintaining such member under tension.

8. The combination with a tiltable receptacle, a power driven screw, a crosshead having a nut engaging said screw, a rod operatively connected to said crosshead and said receptacle, and a trough-like housing for said screw and crosshead, and having an open top through which said rod extends, of a cover over and above the top of said trough-like housing and having sheet-like flexible end portions and a rigid intermediate portion, rollers adjacent the ends of said housing upon which the sheet-like flexible parts of said cover are adapted to be wound, means connecting said cover and said crosshead whereby said cover is moved longitudinally as said crosshead is moved, and means for rotating said rollers in opposite directions to maintain said cover under tension.

9. The combination with a tiltable receptacle, a power driven screw, a crosshead having a nut engaging said screw, a rod operatively connected to said crosshead and said receptacle, and a trough-like housing for said screw and crosshead, and having an open top through which said rod extends, of a member having flexible sheet-like end portions and a rigid intermediate portion and forming a cover over and above the top of said trough-like housing, rollers supported adjacent the ends of the trough-like housing and upon which said flexible sheet-like parts are adapted to be wound, means connecting said member and said crosshead whereby said member is moved longitudinally as said crosshead is moved, means for rotating said rollers in the same direction, and means tending to move one of said rollers away from the other to maintain said member under tension.

10. The combination with a tiltable receptacle, a power driven screw, a crosshead having a nut engaging said screw, a rod operatively connected to said crosshead and said receptacle, and a trough-like housing for said screw and crosshead, and having an open top through which said rod extends, of a cover over and above the top of said trough-like housing and having flexible sheet-like end portions and a rigid intermediate portion, rollers adjacent the ends of said housing and upon which said sheet-like parts are adapted to be wound, means connecting said member and said crosshead whereby said member is moved longitudinally as said crosshead is moved, means for rotating said rollers in the same direction, and spring means tending to move one of said rollers away from the other to maintain said member under tension.

HARRY L. McFEATERS.